Oct. 27, 1964     A. M. WILHITE ETAL     3,154,209
BOTTLE CASE

Filed Oct. 19, 1961                                 2 Sheets-Sheet 1

INVENTORS
A.M. WILHITE and
G.J. HARTUNG

BY
ATTORNEY

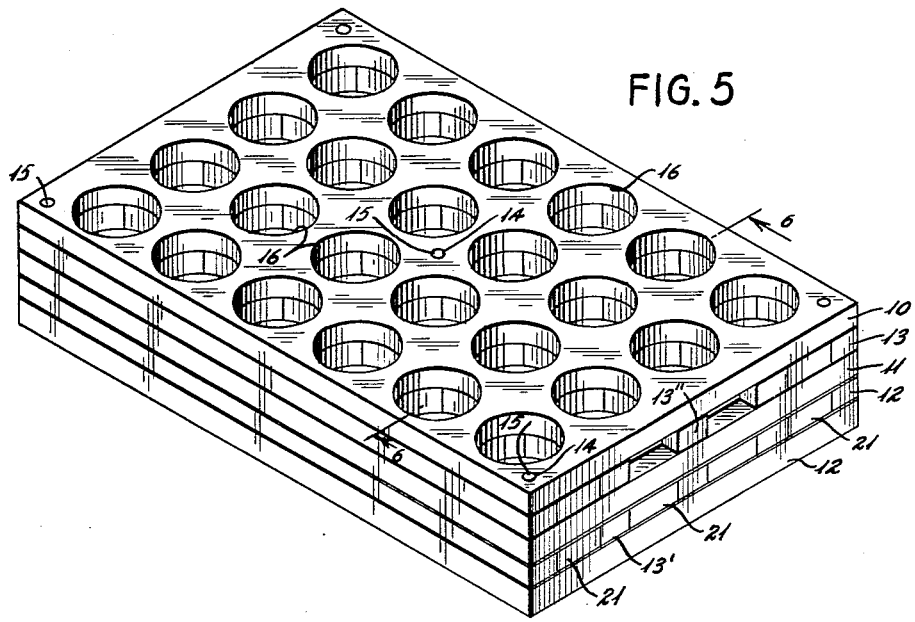
FIG. 5
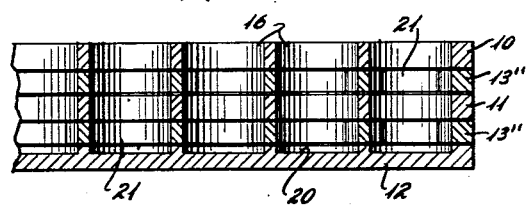
FIG. 7
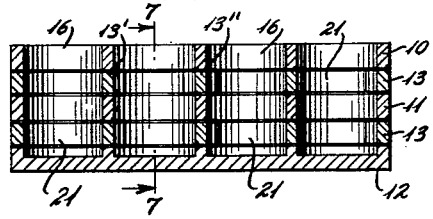
FIG. 6
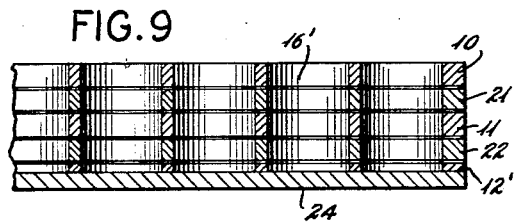
FIG. 9
FIG. 8
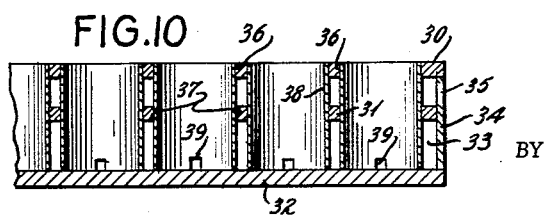
FIG. 10
INVENTORS
A.M. WILHITE and
G.J. HARTUNG
BY
ATTORNEY United States Patent Office 3,154,209
Patented Oct. 27, 1964

3,154,209
BOTTLE CASE
Alfred M. Wilhite, Parkway Plaza, Tuscumbia, Ala., and Glenn J. Hartung, 1922 Holiday Drive, Florence, Ala.
Filed Oct. 19, 1961, Ser. No. 146,149
1 Claim. (Cl. 217—21)

This invention relates to the containing, handling and transportation of goods, wares or merchandise in circular containers or bottles and to receptacles or carriers in which such circular containers or bottles are received, stored and transported.

The invention relates particularly to a bottle case or carrier for use in the containing, storing and transporting of reusable bottles or containers which when filled can be stacked with others to simplify handling and transportation.

Prior bottle carriers or containers of various kinds of wood, metal, cardboard, plastic and other materials have been produced including containers with partitions defining individual compartments spaced to prevent injury or destructive contact between the articles contained. Such compartments usually have been square or larger than the articles so that there was general shaking and rattling of the articles and permittin forceful impact therebetween. Prior bottle cases or carriers have been subject to criticism because of their frailty, could not be easily made or reasonably constructed at small cost and which were not strong enough to withstand a substantial amount of abuse.

It is an object of the invention to provide a strong, uncomplicated bottle case or carrier which can be made of readily available wood or a substitute therefor, which will snugly receive and hold the bottles in spaced relation with minimum movement and which can be readily handled and stacked.

Figure 1:
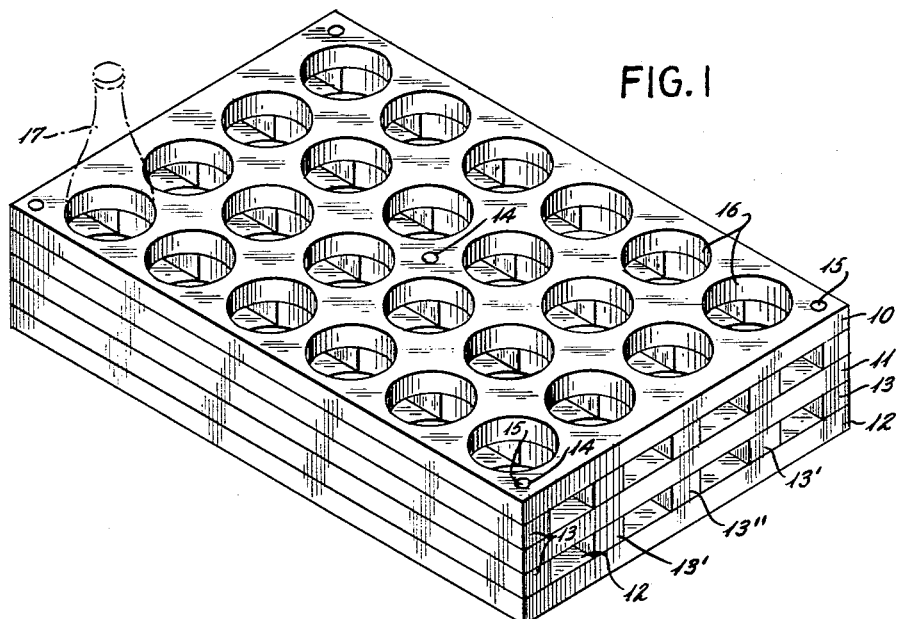
Figure 2:
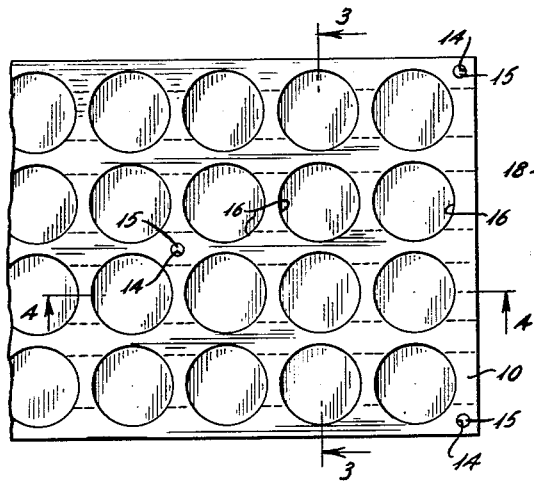
Figure 3:
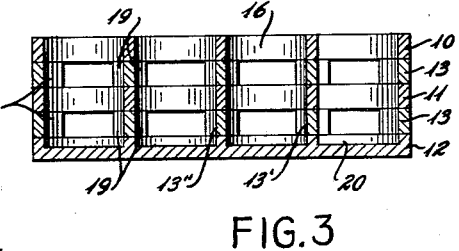
Figure 4:
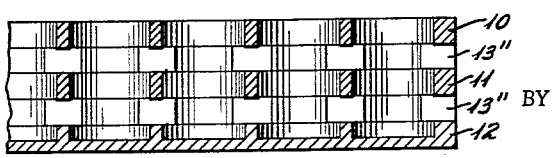

Other objects and advantages of the invention will be apparent from the following description taken in conjunction with the accompanying drawings wherein:

FIG. 1 is a perspective illustrating a bottle case or carrier in accordance with the present invention;

FIG. 2, a fragmentary top plan view;

FIG. 3, a vertical section on the line 3—3 of FIG. 2;

FIG. 4, a vertical section on the line 4—4 of FIG. 2;

FIG. 5, a perspective of a modified form of the invention;

FIG. 6, a section on the line 6—6 of FIG. 5;

FIG. 7, a fragmentary vertical section on the line 7—7 of FIG. 6;

FIG. 8, a vertical section similar to FIG. 6 of a further modified form of the invention;

FIG. 9, a fragmentary vertical section on the line 9—9 of FIG. 8; and

FIG. 10, a fragmentary vertical section similar to FIGS. 7 and 9 of a further modified form of the invention.

Briefly stated, the present invention comprises a generally rectangular case adapted to receive a plurality of bottles or other cylindrical containers and comprises multiple layers joined together by a waterproof adhesive and doweled for added strength. The case is provided with multiple cylindrical openings which extend substantially through the case and has means at the bottom to prevent the passage of the containers therethrough. The openings are slightly larger in diameter than the containers which they receive to prevent forceful impact between such containers. The opposite ends of the case are provided with finger receiving openings to permit the case to be lifted.

With continued reference to the drawings, the invention is a generally rectangular case or container composed of multiple layers 10, 11 and 12 of generally rectangular configuration and in which preferably the grain extends crosswise or from side to side. In order to provide depth to the case or containers the layers 10, 11 and 12 are spaced apart by means of strips or spacers 13 disposed lengthwise along and between the side edge portions of the layers and strips 13' disposed lengthwise intermediate the strips 13 in generally parallel relation thereto and including a central strip 13''. The layers 10, 11 and 12 and the strips 13 are secured in fixed relation by means of a commercially available waterproof glue 14 as well as pins or dowels 15 one at each corner and if desired, and additional such pin or dowel through the center.

The body of the case as described above is provided with cylindrical openings 16 through the layers 10, 11 and partially through the layer 12. Each of the strips 13 at the sides of the device is provided with a cutout 18 and the intermediate strips 13' are provided with opposed cutouts 19 while the bottom layer 12 is provided with a well or pocket 20 to provide receiving openings for the bottles or receptacles 17. Due to the spacing of the layers by means of the strips 13, 13' and 13'', the case easily may be lifted by the insertion of the fingers of the hand between the layers 10 and 11 at opposite sides of the center strip 13'' without the necessity of providing a handle or a cutout portion for receiving the fingers of the hand.

As illustrated in FIGS. 5–7 the construction of the case or container may be slightly different. Instead of the spaced strips 13, 13' and 13'' additional strips 21 may be added in side by side abutting relation with the strips 13, 13' and 13'' to provide a substantially solid layer in which event the strips 21 at each side of the center strip 13'' between the layers 10 and 11 may be slightly shorter to accommodate the fingers so that the device may be lifted.

In FIGS. 8 and 9 the case is made of the three layers 10, 11 and 12 and intermediate layers 22 and 23 which may be solid and have the grain of the wood extending lengthwise of the case. Openings 16' extend entirely through the structure including the bottom layer 12' and closure means in the form of strips 24 received in notches 25 in the layer 12' extend beneath each of the four rows of openings to prevent the passage of containers therethrough.

As illustrated in FIG. 10, the case may be constructed of three layers 30, 31 and 32 connected by side members 33 and end members 34. The end members 34 are provided with openings 35 by means of which the case can be lifted. The layers 30 and 31 have a series of aligned openings 36 and 37 in which are received sleeves 38 of a size to accommodate the bottles or receptacles. The sleeves 38 terminate in abutting relation with the bottom layer 32 and each sleeve has one or more notches 39 in its bottom edge to permit drainage.

It will be apparent that a strong durable case is provided for cylindrical containers to aid in the storing, transporting and dispensing of such containers and to prevent forceful impact which causes breakage of such containers.

It will be obvious to those skilled in the art that various changes may be made in the invention without departing from the spirit and scope thereof and therefore the invention is not limited by that which is illustrated in the drawings and described in the specification, but only as indicated in the accompanying claim.

What is claimed is:

A receptacle for generally cylindrical objects comprising top, intermediate and bottom layers, each of said layers being generally rectangular and of one-piece construction, said top and intermediate layers having a plurality of spaced openings extending therethrough, the openings in said top layer being in alignment with the openings in said intermediate layer, the diameter of said openings being slightly larger than the diameter of the objects to be inserted therein, said bottom layer having a plurality of spaced cylindrical recesses disposed in alignment with the openings of said top and intermediate layers for receiving and supporting said objects, a series of spacer strips located between said top and intermediate layers and between said intermediate and bottom layers, said strips extending the full length of said layers in spaced generally parallel relation with each other and providing openings in the ends of said receptacle forming finger gripping portions, the space between adjacent strips being less than the diameter of said openings, said strips having cutout portions in alignment with said openings, a waterproof adhesive connecting said layers and said strips in assembled relation, and a series of dowel pins connecting said layers and strips for added strength.

References Cited in the file of this patent

UNITED STATES PATENTS

| | | |
|---|---|---|
| D. 162,548 | Jones | Mar. 20, 1951 |
| 241,142 | Keech | May 10, 1888 |
| 1,200,085 | Crane | Oct. 3, 1916 |
| 1,714,633 | Scarlett | May 28, 1929 |
| 1,924,475 | Wildberg | Aug. 29, 1933 |
| 1,986,421 | Windfuhr | Jan. 1, 1935 |
| 2,113,404 | Hopwood | Apr. 5, 1938 |
| 2,134,251 | Hopwood | Oct. 25, 1938 |
| 2,322,797 | Fishel | June 29, 1943 |
| 2,353,819 | Duell | July 18, 1944 |
| 2,840,256 | Cobb | June 24, 1958 |
| 2,951,606 | Benson | Sept. 6, 1960 |

FOREIGN PATENTS

| | | |
|---|---|---|
| 789,400 | Great Britain | Jan. 22, 1958 |